United States Patent [19]
Koyama

[11] Patent Number: 4,729,050
[45] Date of Patent: Mar. 1, 1988

[54] THIN-FILM VERTICAL MAGNETIZATION TRANSDUCER HEAD

[75] Inventor: Masataka Koyama, Yokohama, Japan

[73] Assignee: Victor Company of Japan, Ltd., Japan

[21] Appl. No.: 703,682

[22] Filed: Feb. 20, 1985

[30] Foreign Application Priority Data

Feb. 23, 1984 [JP] Japan .................. 59-33035

[51] Int. Cl.$^4$ .............. G11B 5/09; G11B 5/127; G11B 5/147
[52] U.S. Cl. ................................. 360/125; 360/126; 360/119
[58] Field of Search ............ 360/125, 126, 127, 123, 360/119

[56] References Cited

U.S. PATENT DOCUMENTS

| | | | |
|---|---|---|---|
| 4,195,323 | 3/1980 | Lee | 360/126 X |
| 4,219,855 | 8/1980 | Jones, Jr. | 360/125 |
| 4,295,173 | 10/1981 | Romankiw et al. | 360/125 |
| 4,317,148 | 2/1982 | Chi | 360/125 X |
| 4,321,641 | 3/1982 | Lee | 360/126 |
| 4,353,102 | 10/1982 | Kanai et al. | 360/125 X |
| 4,423,451 | 12/1983 | Chi | 360/125 |
| 4,550,353 | 10/1985 | Hirai et al. | 360/125 |

FOREIGN PATENT DOCUMENTS

57-3210  1/1982  Japan .
58-77017 5/1983 Japan ................. 360/126

OTHER PUBLICATIONS

IBM-TDB, Thin Film Magnetic Heads-K. E. Petersen; vol. 21, No. 12; May 1979.

Primary Examiner—Stuart N. Hecker
Assistant Examiner—Alyssa H. Bowler
Attorney, Agent, or Firm—Lowe, Price, Leblanc, Becker & Shur

[57] ABSTRACT

A thin film vertical magnetization transducer head comprises an auxiliary magnetic pole of larger thickness and a main magnetic pole of smaller thickness having a pole face opposed to and spaced from the pole face of the auxiliary pole to define an air gap therebetween and to form a thin-film magnetic core with the auxiliary magnetic pole. A thin-film nonmagnetic structure supports the thin-film magnetic core so that the main pole is substantially centered with respect to the thickness of the auxiliary pole. The nonmagnetic structure is formed with a passage extending to the air gap to allow the magnetic recording medium to pass through the air gap in the direction of the thickness of the core. A coil structure is provided insulatively surrounding the auxiliary magnetic pole for generating a magnetic field across the pole faces.

5 Claims, 20 Drawing Figures

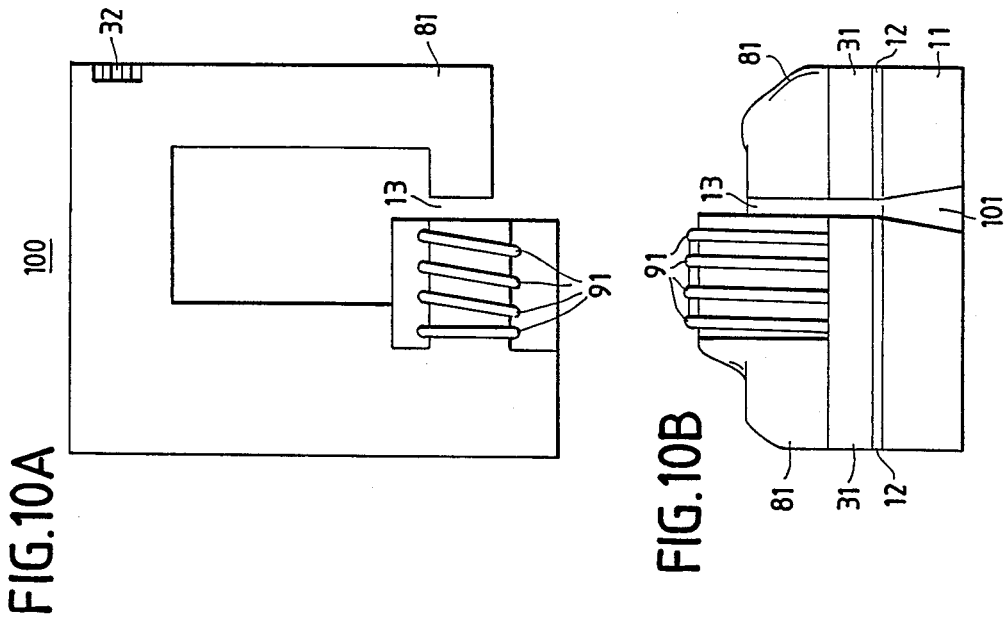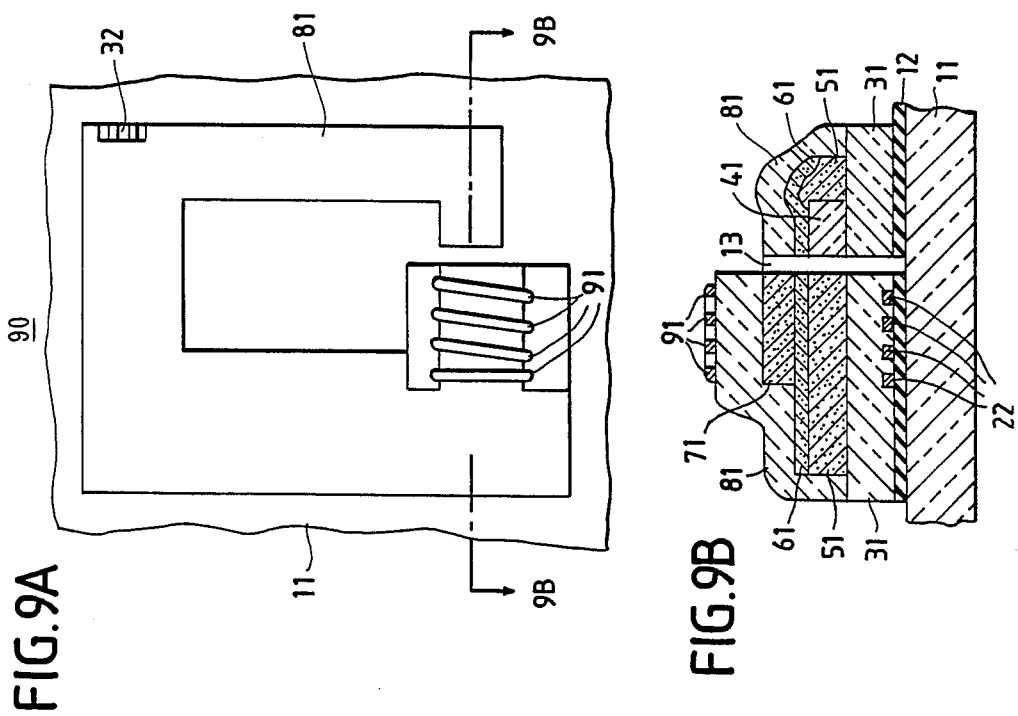

THIN-FILM VERTICAL MAGNETIZATION TRANSDUCER HEAD

BACKGROUND OF THE INVENTION

The present invention relates to electromagnetic transducer heads for magnetic recording and reproduction, and more specifically to a vertical magnetization transducer head and a method for fabricating the head.

Vertical magnetization has been known in the art as an effective means of achieving high density recording. One problem associated with manufacturing a transducer head of this type in mass production is the difficulty in providing an air gap length of the order of 20 micrometers consistently with a high degree of precision.

One possible solution, as shown and described in Japanese Patent Publication 57-3210, involves the use of a thin-film technique to form a loop of magnetic path on a substrate having an air gap such that the loop extends from one edge of the air gap to the opposite edge of the air gap to define the main and auxiliary poles of the head across the air gap. A coil is provided around a portion of the thin film adjacent the auxiliary pole. The magnetic loop comprises a single layer of a magnetic material and thus the main and auxiliary poles have equal thickness. One problem associated with the single-layered thin film poles is the need to impose close tolerances for aligning the opposed poles since any misalignment therebetween would result in a substantial loss of magnetic flux lines.

SUMMARY OF THE INVENTION

Accordingly, an object of the present invention is to provide a precision vertical magnetization transducer head which lends itself to mass production and ensures satisfactory operation.

A further object of the invention is to provide a method for fabricating the vertical magnetization transducer head of the type described.

The present invention eliminates the problem of misalignment of the single layer thin opposed poles discussed above and prevents the loss of magnetic flux due to misregistration between the opposed pole faces which arises due to their small thicknesses for high density recording. The problem is solved and an improvement achieved by the present invention by making one of the magnetic poles have a larger thickness than the other to allow the small thickness pole to slightly deviate from the center of the larger thickness pole without losing the magnetic field strength. The larger thickness pole acts as an auxiliary pole and is wound with a coil so that the magnetic flux it generates therein concentrates in the other pole layer which acts as a main pole.

The vertical magnetization head of the invention comprises an auxiliary magnetic pole of a larger thickness and a main magnetic pole of a smaller thickness having a pole face opposed to and spaced from the pole face of the auxiliary pole to define an air gap therebetween and to form a thin-film magnetic core with the auxiliary magnetic pole. A thin-film nonmagnetic structure supports the thin-film magnetic core so that the main pole is substantially centered with respect to the thickness of the auxiliary pole. The nonmagnetic structure is formed with a passage extending to the air gap to allow the magnetic recording medium to pass through the air gap in the direction of the thickness of the core. A coil structure is provided insulatively surrounding the auxiliary magnetic pole for generating a magnetic field across the pole faces.

With the smaller-thickness magnetic being substantially centered with respect to the thickness of the larger-thickness portion thereof, the magnetic flux lines emanating from the former seek the paths of least reluctance without loss to the latter after leaving a magnetic tape transported between the air gap.

The method of fabricating a vertical magnetization transducer head according to the invention comprises providing support means on which a core having an air gap is to be formed. First coil segments are formed on the support means in a first area adjacent that corresponding to the gap location. A first layer of nonmagnetic material is formed on the support means covering intermediate portions of the first coil segments while exposing end portions of the first coil segments. The method further comprises the steps of forming a second layer of nonmagnetic material on the first magnetic layer in a second area adjacent that corresponding to the gap and opposite the first area, forming a first layer of magnetic material on the area of the first nonmagnetic layer unoccupied by the second nonmagnetic layer, followed by the formation of a second layer of magnetic material on the first magnetic layer and the second nonmagnetic layer and by the formation of a third layer of magnetic material on the second magnetic layer in an area covering the first magnetic layer. The exposed portions off the first, second and third magnetic material adjacent the first area are covered with a third layer of nonmagnetic material. Second coil segments are then formed on the third nonmagnetic layer, the second coil segments respectively extending downward to the end portions of the first coil segments to produce a coil. Finally, portions of the support means corresponding to the gap and which are unoccupied by the overlying layers are removed to form the air gap in the support means.

BRIEF DESCRIPTION OF THE DRAWINGS

The present invention will be described in further detail with reference to the accompanying drawings, in which:

FIGS. 1A, 2A, 3A, 4A, 5A, 6A, 7A, 8A, 9A and 10A are plan views respectively illustrating successive steps of fabricating a vertical magnetization transducer head according to the present invention;

FIGS. 1B, 2B, 3B, 4B, 5B, 6B, 7B, 8B and 9B are cross-sectional views taken along the lines 1B, 2B, 3B, 4B, 5B, 6B, 7B, 8B and 9B of FIGS. 1A through 9A, respectively; and FIG. 10B is a side view of the transducer head of FIG. 10A.

DETAILED DESCRIPTION

Figure 1A:
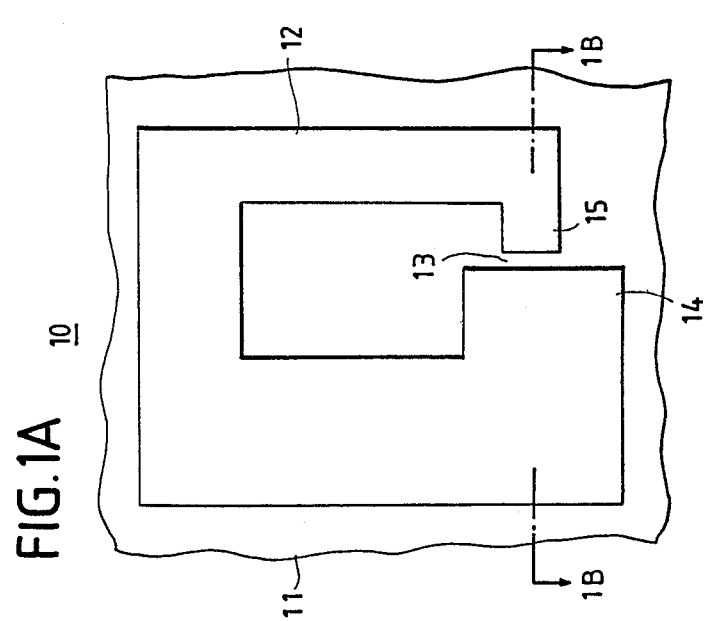
Figure 1B:
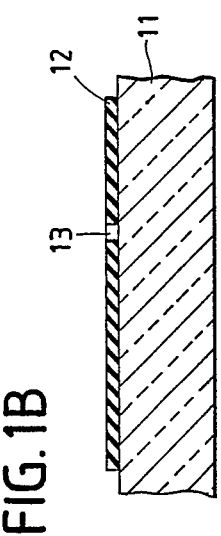

The vertical magnetization transducer head according to the invention is fabricated in a sequence of steps respectively shown in the drawings in which the cross-sectional views are exaggerated in vertical dimension for the purpose of clarity. In the first step shown at 10 in FIGS. 1A and 1B, a 3000-Angstrom thick nonmagnetic substrate 11, preferably of silicon, is prepared. An insulative layer 12 is deposited on substrate 11 and is etched to define a rectangular loop having an air gap 13 between opposed edges of a large-width end portion 14 and a narrow-width end portion 15 of the loop. Suitable material for the insulative layer 12 is $Si_3N_4$ or $SiO_2$. The narrow-width end portion 15, which serves as a base on which the main pole of the head will be created, is substantially aligned to the center of the end portion 14 which serves as a base on which the auxiliary magnetic pole with be formed. The opposed edges of the end portions 14 and 15 are separated by a distance of 21 micrometers to permit magnetic tape to pass therebetween in a direction perpendicular to the surface of the sheet.

Figure 2A:
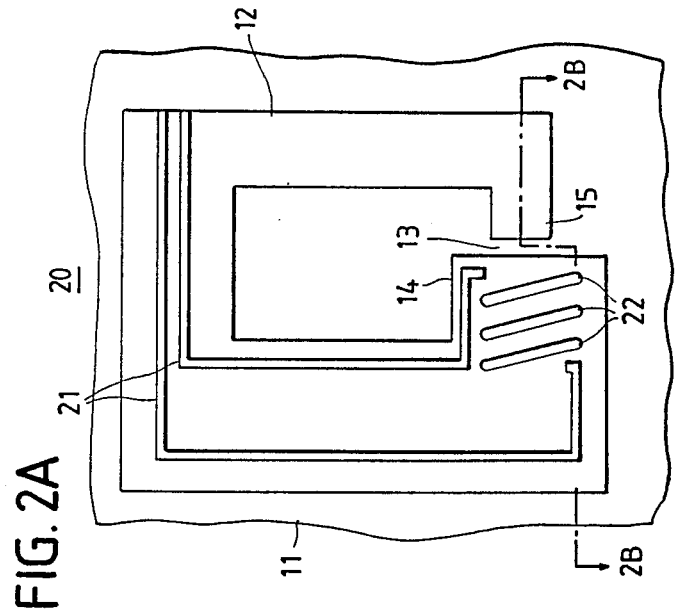
Figure 2B:
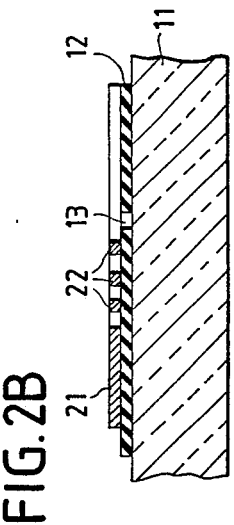

The next step involves the creation of a device 20 shown at FIGS. 2A and 2B by deposition of copper, for example, on the surface of the insulative layer 12, forming connecting leads 21 and parallel coil segments 22 which serve as a lower half portion of a coil that surrounds the auxiliary pole.

Figure 3A:
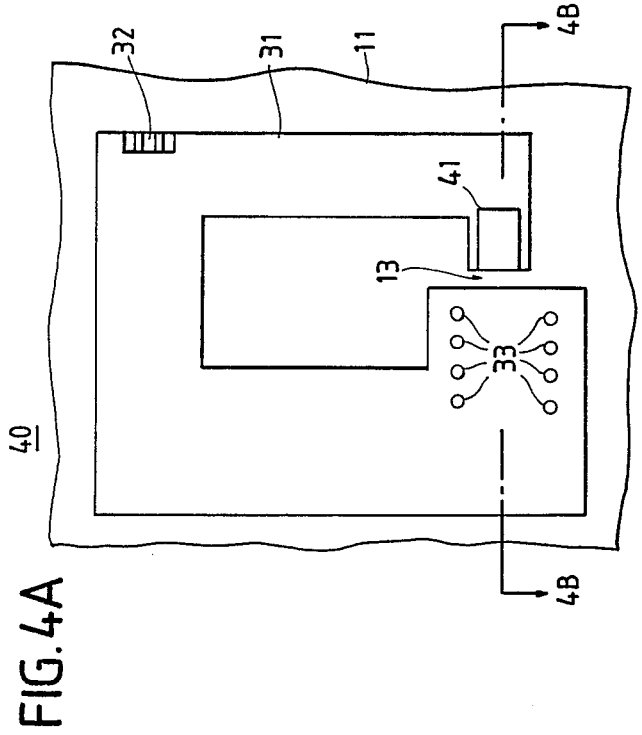
Figure 3B:
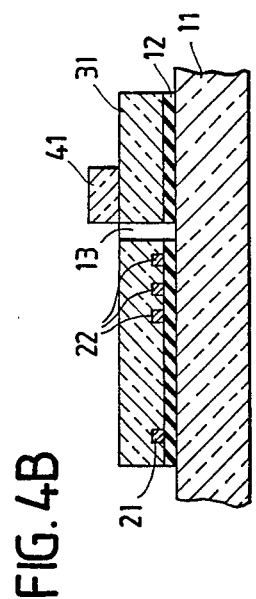

In FIGS. 3A, 3B, a first layer 31 of nonmagnetic material such as polyimide is applied over the surface of device 30 and etched away to expose end portions of connecting leads 21 to serve as terminals 32 to an external circuit and create holes 33 that extend to ends of connecting leads 21 and coil segments 22. After the etching, the polyimide layer is baked at 250° C. for four hours.

Figure 4A:
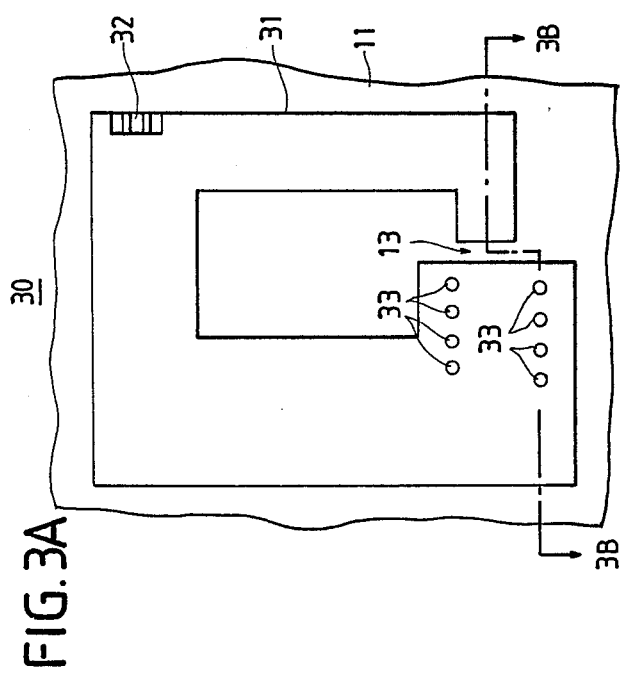
Figure 4B:
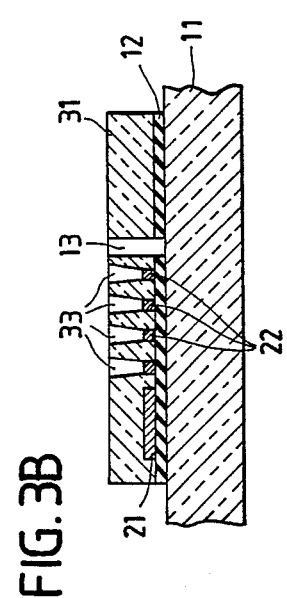

In FIGS. 4A, 4B, the head shown at 40 includes another nonmagnetic layer 41 which is deposited on the first nonmagnetic layer 31 over the narrow-width end portion 15 with the left edge being aligned vertically with the underlying layers to define a portion of the air gap 13. The layer 41 serves as a reference height on which the main pole is to be deposited with respect to a center portion of the auxiliary pole. A typical thickness of layer 41 is 2000 Angstroms.

Figure 5A:
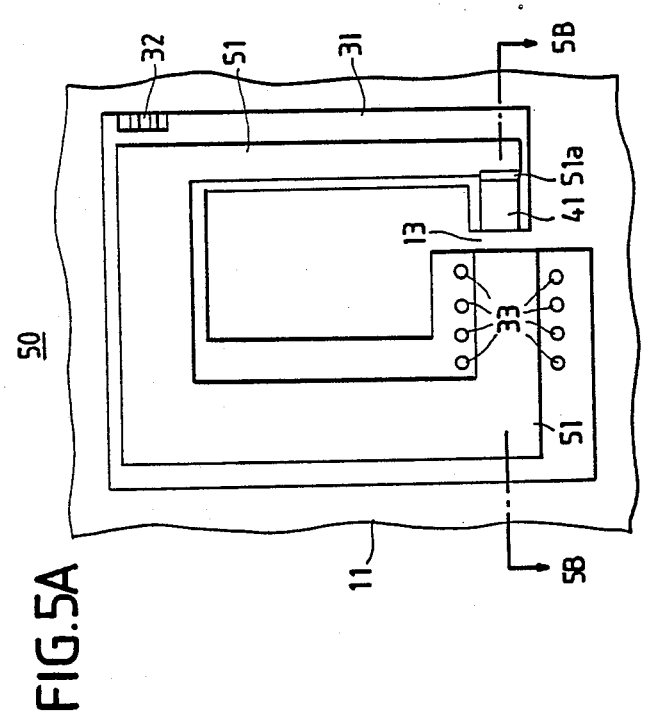
Figure 5B:
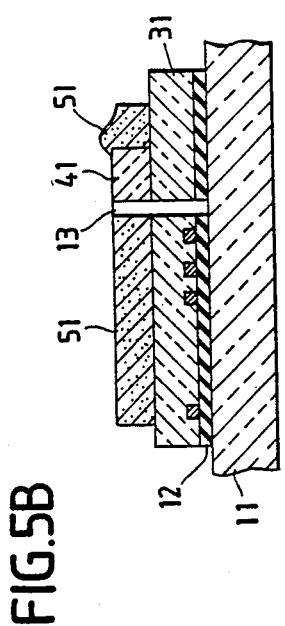

In the following step, shown at 50 in FIGS. 5A, 5B, a ferromagnetic material (such as Sendust, a tradename) is sputtered on an area of nonmagnetic layer 31 which is unoccupied by the nonmagnetic layer 41 until the thickness of the layer 41 is reached to form a first magnetic layer 51 with a thickness of 2000 Angstroms. This layer extends from the left edge of air gap 13 passing between rows of holes 33 to the right edge of nonmagnetic layer 41 where the sputtered magnetic material somewhat overlaps to create a hump. This serves to keep a crevice from occurring at the joint which would otherwise cause a discontinuity in an overlying thin layer which is to be deposited.

Figure 6A:
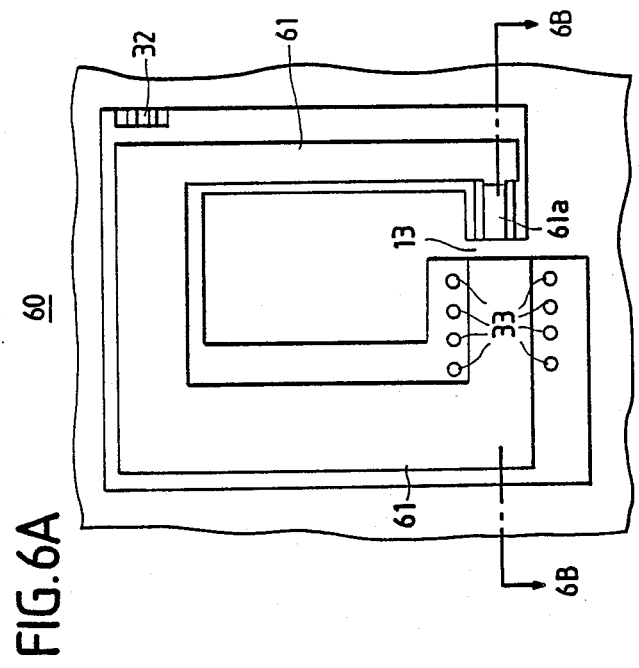
Figure 6B:
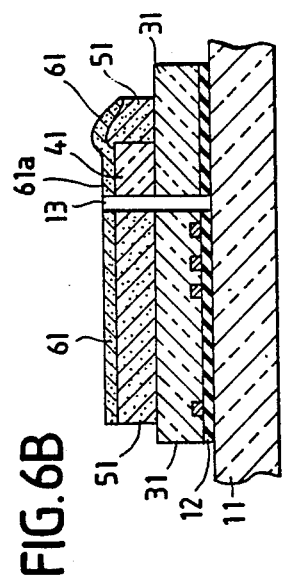

The step of FIGS. 6A, 6B, shown at 60, follows to create a second magnetic layer 61 having a thickness of 500 Angstroms over the surfaces of the first magnetic layer 51 and nonmagnetic layer 41, increasing the depth of air gap 13. The portion of the second magnetic layer 61 which is deposited on the layer 41 as shown at 61a has a width of 25 micrometers which is narrower than the underlying layer 41. The portion of the magnetic layer 61 located on layer 41 defines the main pole of the head which is vertically aligned with the portion of layer 61 located on the opposite side of air gap 13 which defines an intermediate layer of the auxiliary pole.

Figure 7A:
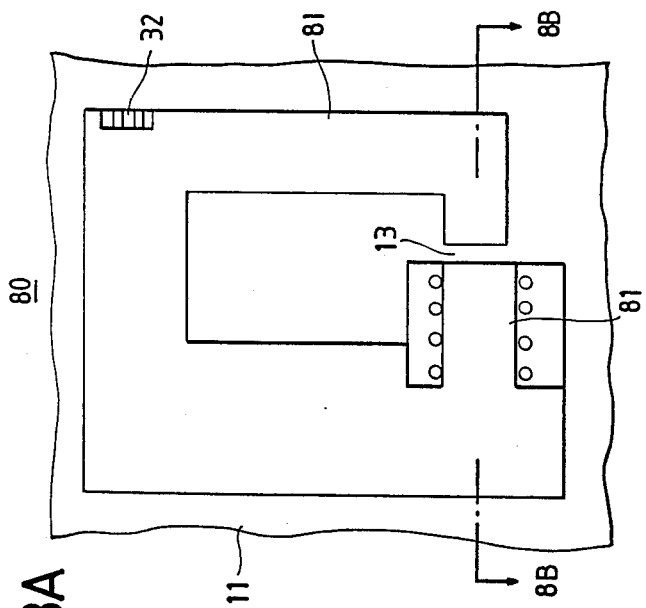
Figure 7B:
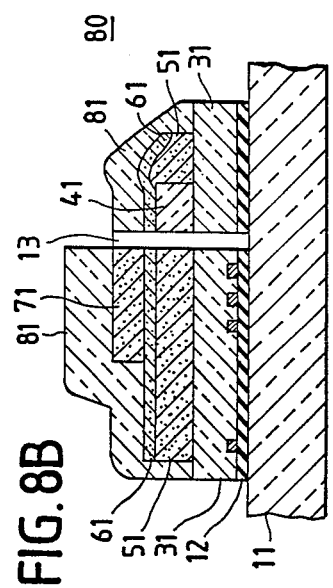

The seventh step shown at 70 in FIGS. 7A, 7B involves depositing a third magnetic layer 71, 2000-Angstrom thick, on the portion of second magnetic layer 61 directly above the coil segments 22, with the right edge of layer 71 being aligned with the underlying layers. A conventional lift off method may be used to form this layer. The auxiliary pole of the head is thus formed on the left side of air gap 13 by the upper layer 71 and the underlying portions of layers 61 and 51.

Figure 8A:
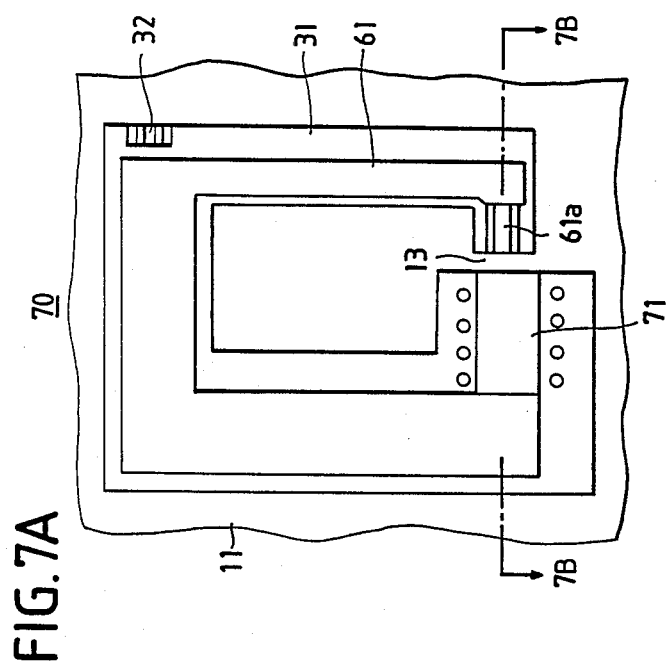
Figure 8B:
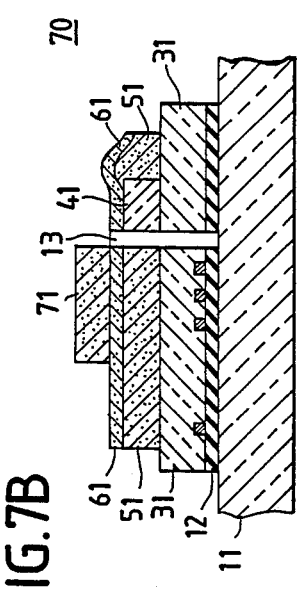

The eigth step shown at 80 in FIGS. 8A, 8B involves the deposition of a third nonmagnetic layer 81 which at least covers, the laminated portions of magnetic layers 51 61 and 71 and preferably covers the entire area of the layers overlying the first nonmagnetic layer 31 with the exception of terminal 32 and holes 33.

The next step indicated at 90 in FIGS. 9A, 9B completes the coil of the vertical magnetization head by coupling the ends of connecting leads 21 and coil segments 22 in series with conductive segments 91 surrounding the successively deposited portions of layers 31, 51, 61, 71 and 81 through holes 33.

A photoresist coat is applied over the head except for the silicon substrate 11 and anisotropic mesa etching technique is employed to remove the portions of substrate 11 where the coating is not provided, thereby creating a space 101 in the head 100 and extending the air gap 13 through the substrate 11 as shown in FIGS. 10A, 10B.

A plurality of transducer heads can be fabricated on a single substrate 11. In this case, the outer peripheral edges of the transducer heads are broken off into individual devices by means of a dicing machine.

The foregoing description shows only one preferred embodiment of the present invention. Various modifications are apparent to those skilled in the art without departing from the scope of the present invention which is only limited by the appended claims. Therefore, the embodiments shown and described are only illustrative, not restrictive.

What is claimed is:

1. A vertical magnetization transducer head comprising:
    a main magnetic pole member having a first thickness and a first width;
    an auxiliary magnetic pole member having a second thickness larger than said first thickness and a second width greater than said first width, the pole face of the auxiliary magnetic pole being opposed to and spaced from the pole face of the main magnetic pole member to define an air gap therebetween, said main and auxiliary pole members forming a thin-film magnetic core;
    a coil;
    a nonmagnetic substrate; and
    a thin-film nonmagnetic structure formed on said magnetic substrate for supporting said thin-film magnetic core so that said main pole member is substantially centered with respect to the thickness of said auxiliary pole member and for insulatively mounting said coil around said auxiliary magnetic pole member for generating a magnetic field across the opposed pole faces, said nonmagnetic substrate and said thin-film nonmagnetic structure having a passage extending to said air gap for allowing a magnetic recording medium to pass through said air gap in the direction of the thickness of said core.

2. A vertical magnetization transducer as defined in claim 1, wherein said main magnetic pole member is substantially centered with respect to the width of said auxiliary pole member.

3. A vertical magnetization transducer as defined in claim 1 wherein said thin-film nonmagnetic structure comprises:
    an insulative layer on said nonmagnetic substrate,
    a nonmagnetic lower layer between said insulative layer and said core, and a nonmagnetic upper layer on said core; and wherein said coil comprises:

lower conductive segments embedded between said insulative layer and said nonmagnetic lower layer; and upper conductive segments on said nonmagnetic upper layer, said upper conductive segments having opposite ends connected respectively to opposite ends of said lower conductive segments.

4. A vertical magnetization transducer head as defined in claim 1, wherein said nonmagnetic substrate is silicon.

5. A vertical magnetization transducer head, comprising:

a support having an air gap;

first coil segments arranged on said support on a first side of said air gap;

a first nonmagnetic layer arranged on said support and on midportions of said first coil segments;

a second nonmagnetic layer arranged on a portion of said first nonmagnetic layer located on a second, opposite side of said air gap;

a first magnetic layer arranged on a portion of said first nonmagnetic layer on said first side of said air gap;

a second magnetic layer having a first portion arranged on said first magnetic layer and a second portion arranged on said second nonmagnetic layer, said first and second portions defining therebetween a magnetic air gap extending to the air gap of said support;

a third magnetic layer arranged on said first portion of the second magnetic layer;

a third nonmagnetic layer arranged on said third magnetic layer, which third nonmagnetic layer covers side portions of the first, second and third magnetic layers; and second coil segments arranged on said third nonmagnetic layer, opposite ends of the second coil segments extending into contact with opposite ends of said first coil segments to form a coil, said second portion of said second magnetic layer forming a main magnetic pole member having a first thickness and a first width, and said first magnetic layer, said first portion of said second magnetic layer and said third magnetic layer defining an auxiliary magnetic pole member having a second thickness greater than said first thickness and a second width greater than said first width.

* * * * *